US009267819B2

(12) United States Patent
Cook

(10) Patent No.: US 9,267,819 B2
(45) Date of Patent: Feb. 23, 2016

(54) ABSOLUTE POSITION ENCODER SCALE HAVING PLATES ALTERNATING WITH VARYING RECESSES

(71) Applicant: Mitutoyo Corporation, Kanagawa-ken (JP)

(72) Inventor: Ted Staton Cook, Kirkland, WA (US)

(73) Assignee: Mitutoyo Corporation, Kanagawa-ken (JP)

( * ) Notice: Subject to any disclaimer, the term of this patent is extended or adjusted under 35 U.S.C. 154(b) by 99 days.

(21) Appl. No.: 14/303,266

(22) Filed: Jun. 12, 2014

(65) Prior Publication Data

US 2015/0362336 A1 Dec. 17, 2015

(51) Int. Cl.
*G01R 33/02* (2006.01)
*G01D 5/20* (2006.01)

(52) U.S. Cl.
CPC ........................................ *G01D 5/20* (2013.01)

(58) Field of Classification Search
CPC .. G01R 29/10; G01R 29/105; G01R 33/3415; G01N 21/718
USPC ............... 324/207.11–207.25, 200, 234, 235, 324/238, 240, 256–258, 500, 600
See application file for complete search history.

(56) References Cited

U.S. PATENT DOCUMENTS

| | | | |
|---|---|---|---|
| 3,882,482 A | 5/1975 | Green et al. | |
| 4,109,389 A | 8/1978 | Balcom et al. | |
| 4,414,754 A | 11/1983 | Lapeyre | |
| 4,717,874 A | 1/1988 | Ichikawa et al. | |
| 4,737,698 A | 4/1988 | McMullin et al. | |
| 4,879,555 A | 11/1989 | Ichikawa et al. | |
| 4,964,727 A | 10/1990 | Huggins | |

(Continued)

FOREIGN PATENT DOCUMENTS

| | | |
|---|---|---|
| CA | 2068795 A1 | 2/1993 |
| EP | 1 229 301 A1 | 8/2002 |

(Continued)

OTHER PUBLICATIONS

"Introduction to Eddy Current Testing," retrieved from https://www.nde-ed.org/Education/Resources/CommunityCollege/EddyCurrents/cc_ec_index.htm, retrieved on Aug. 31, 2014, 106 pages.

(Continued)

*Primary Examiner* — Melissa Koval
*Assistant Examiner* — Trung Nguyen
(74) *Attorney, Agent, or Firm* — Seed IP Law Group PLLC

(57) ABSTRACT

An absolute position encoder scale is provided having scale elements (e.g., plates and plate abatement features such as recesses) which alternate along the scale pattern. At least one of the scale elements has a characteristic (e.g., a recess depth) that is varied along the scale pattern to provide a different respective eddy current response. A signal portion of a read head is responsive to the respective eddy currents to output absolute position signals. For the plate abatement features, the characteristic that may be varied may be a recess depth, an amount of a non-conductive area, an amount of a recessed area, etc. As a varying depth example, the scale may be formed from a bulk material (e.g., aluminum) in which progressively deeper recessed depths are cut along the scale. For plate features, the characteristic that may be varied may include a plate height, an amount of a plate area, etc.

20 Claims, 12 Drawing Sheets

(56) References Cited

U.S. PATENT DOCUMENTS

| | | | |
|---|---|---|---|
| 5,010,655 A | 4/1991 | Rieder et al. | |
| 5,055,784 A | 10/1991 | Jaeger et al. | |
| 5,237,391 A | 8/1993 | Huggins | |
| 5,279,044 A | 1/1994 | Bremer | |
| 5,442,166 A | 8/1995 | Hollmann | |
| 5,541,510 A | 7/1996 | Danielson | |
| 5,773,820 A | 6/1998 | Osajda et al. | |
| 5,804,963 A | 9/1998 | Meyer | |
| 5,841,274 A | 11/1998 | Masreliez et al. | |
| 5,886,519 A | 3/1999 | Masreliez et al. | |
| 5,894,678 A | 4/1999 | Masreliez et al. | |
| 5,965,879 A | 10/1999 | Leviton | |
| 5,973,494 A | 10/1999 | Masreliez et al. | |
| 5,998,990 A | 12/1999 | Andermo et al. | |
| 6,002,250 A | 12/1999 | Masreliez et al. | |
| 6,011,389 A | 1/2000 | Masreliez et al. | |
| 6,157,188 A | 12/2000 | Steinke | |
| 6,259,249 B1* | 7/2001 | Miyata | G01B 7/003 324/207.12 |
| 6,271,661 B2 | 8/2001 | Andermo et al. | |
| 6,476,605 B1 | 11/2002 | de Coulon | |
| 6,611,138 B2* | 8/2003 | Vasiloiu | G01D 5/2053 324/207.12 |
| 6,642,711 B2 | 11/2003 | Kawate et al. | |
| 6,664,782 B2 | 12/2003 | Slates | |
| 6,781,694 B2 | 8/2004 | Nahum et al. | |
| 6,867,412 B2 | 3/2005 | Patzwald et al. | |
| 7,239,130 B1 | 7/2007 | Milvich | |
| 7,530,177 B1 | 5/2009 | Meichle et al. | |
| 7,973,941 B2 | 7/2011 | Tobiason | |
| 8,222,891 B2* | 7/2012 | Steinke | G01D 5/24476 324/207.17 |
| 8,309,906 B2 | 11/2012 | Kapner et al. | |
| 2002/0097042 A1* | 7/2002 | Kawate | G01B 7/003 324/207.17 |
| 2005/0104579 A1 | 5/2005 | Slates | |

FOREIGN PATENT DOCUMENTS

| | | |
|---|---|---|
| EP | 1965177 A1 | 9/2008 |
| EP | 2 037 261 A1 | 3/2009 |

OTHER PUBLICATIONS

Lefebvre et al., "Pulsed eddy current empirical modeling," Proc. Vth International Workshop, Advances in Signal Processing for Non Destructive Evaluation of Materials, Quebec City, Canada, Aug. 2-4, 2005, X. Maldague ed., E. du CAO (2006), pp. 69-74.

Roach, "Designing and Building an Eddy Current Position Sensor," Sensors Online, Sep. 1, 1998, retrieved from http://www.sensorsmag.com/sensors/electric-magnetic/designing-and-building-eddy-curre . . . , retrieved on Sep. 25, 2014, 49 pages.

Wang et al., "Ultrastable eddy current displacement sensor working in harsh temperature environments with comprehensive self-temperature compensation," Sensors and Actuators A: Physical 211:98-104, 2014.

Wang et al., "Ultrastable and highly sensitive eddy current displacement sensor using self-temperature compensation," Sensors and Actuators: A Physical (2013), http://dx.doi.org/10.1016/j.sna.2013.09.016.

Qui et al., "Defect classification by pulsed eddy current technique in con-casting slabs based on spectrum analysis and wavelet decomposition," Sensors and Actuators: A Physical (2013), http://dx.doi.org/10.1016/j.sna.2013.09.004.

Rosado et al., "Geometric optimization of a differential planar eddy currents probe for non-destructive testing," Sensors and Actuators A 197 (2013), pp. 96-105.

\* cited by examiner

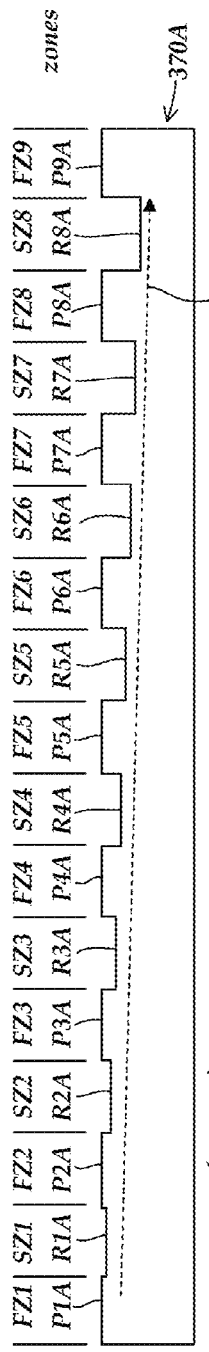
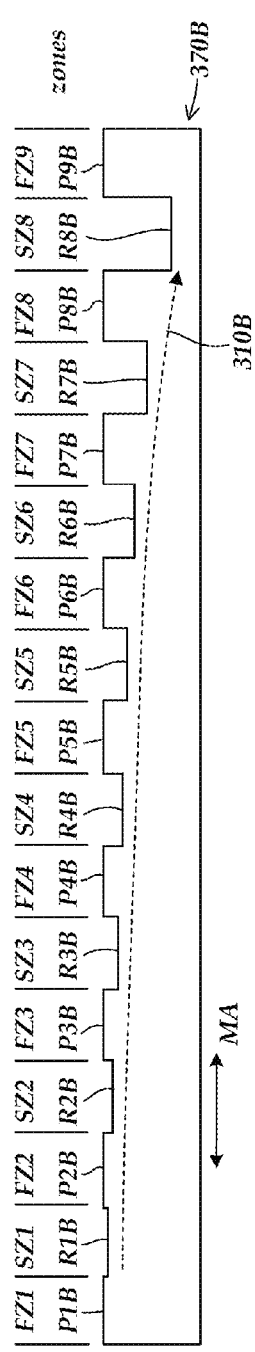
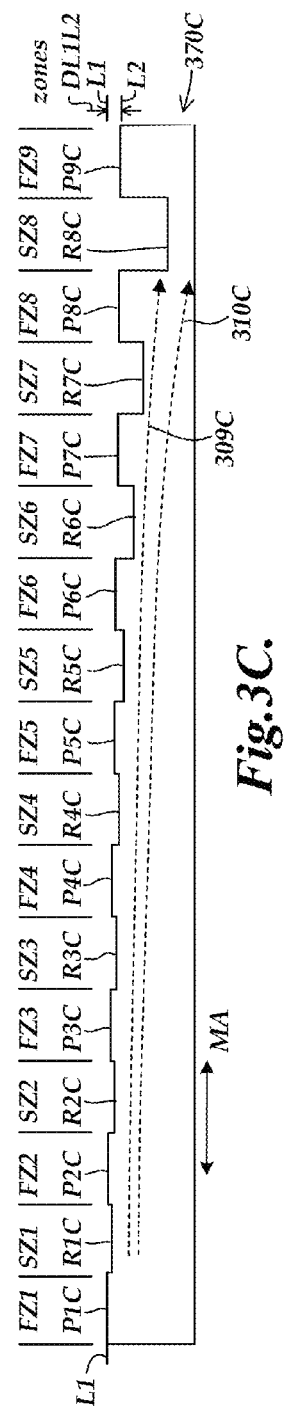
Fig.3A.
Fig.3B.
Fig.3C.

ABSOLUTE POSITION ENCODER SCALE HAVING PLATES ALTERNATING WITH VARYING RECESSES

BACKGROUND

1. Technical Field

The invention relates generally to precision measurement instruments, and particularly to absolute position encoder scales that may be utilized in handheld instruments such as calipers.

2. Description of the Related Art

Various movement or position transducers are currently available, such as optical, capacitive, magnetic, and inductive transducers. These transducers often involve placing a transmitter and a receiver in various geometric configurations to measure movement between two members of the transducer, typically including a read head and a scale. One drawback of certain optical, capacitive, and magnetic transducers is that they tend to be sensitive to contamination. Therefore, using such transducers in most manufacturing or shop environments is impractical. Using such transducers in a shop environment requires expensive and sometimes unreliable environmental seals or other methods of encapsulating the transducer to keep dust, oils, and ferromagnetic particles from contaminating the transducer.

U.S. Pat. No. 6,011,389 (the '389 patent), which is hereby incorporated herein by reference in its entirety, describes an induced current position transducer usable in high accuracy applications. U.S. Pat. No. 5,973,494 (the '494 patent) and U.S. Pat. No. 6,002,250 (the '250 patent), which are each hereby incorporated herein by reference in their entireties, describe incremental position inductive calipers and linear scales, including signal generating and processing circuits. U.S. Pat. Nos. 5,886,519, 5,841,274, and 5,894,678, which are each hereby incorporated herein by reference in their entireties, describe absolute position inductive calipers and electronic tape measures using this induced current transducer. As described in these patents, this induced current transducer is readily manufactured using known printed circuit board technology. This transducer system is also generally immune to contamination by particles, including ferromagnetic particles, oil, water, and other fluids.

As noted above, different implementations of the induced current transducer (as well as the previously noted optical, capacitive, and magnetic transducers) may be implemented as either incremental or absolute position encoders. In general, incremental position encoders utilize a scale structure that allows the displacement of a read head relative to a scale to be determined by accumulating incremental units of displacement, starting from an initial point along the scale. Such encoders are suitable for certain applications, particularly those where line power is available. However, in certain applications, such as those where encoders are used in low power consumption devices, it is more desirable to use absolute position encoders. Absolute position encoders provide a unique output signal, or combination of signals, at each position along a scale. They do not require continuous accumulation of incremental displacements in order to identify a position. Thus, absolute position encoders allow various power conservation schemes. A variety of absolute position encoders are known, using various optical, capacitive, magnetic and inductive technologies, such as those described above.

In addition to the '519; '274, and '678 patents described above for the absolute induced current transducer, U.S. Pat. Nos. 3,882,482, 5,965,879, 5,279,044, 5,237,391, 5,442,166, 4,964,727, 4,414,754, 4,109,389, 5,773,820, and 5,010,655, also disclose various encoder configurations and/or signal processing techniques relevant to absolute encoders, and are each hereby incorporated herein by reference in their entirety. However, many of these disclosed systems fail to teach configurations which provide certain combinations of compact size, high resolution, cost and robustness, including an ability to be generally immune to contamination by particles (e.g., ferromagnetic particles, oil, water, and other fluids) desired by users of absolute encoders. Improved configurations of absolute encoders that provide such combinations would be desirable.

BRIEF SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

A position sensing device is provided that is usable to measure a position of a first member with respect to a second member along a measuring axis. The position sensing device includes a scale and a read head. The scale includes a scale pattern that extends along the measuring axis direction. The read head is movable relative to the scale pattern along the measuring axis direction and includes an excitation portion that excites the eddy currents in the scale pattern and a signal portion that outputs position signals that vary depending on the eddy currents. Due to the utilization of eddy currents, the position sensing device is generally immune to contamination by particles, including ferromagnetic particles, oil, water, and other fluids.

The scale pattern includes a plurality of first scale element zones and a plurality of second scale element zones. The plurality of first scale element zones is arranged periodically along the measuring axis direction, and the first scale element zones include a first type of scale element. The plurality of second scale element zones is arranged periodically along the measuring axis direction and is interleaved with the plurality of first periodic scale element zones such that the first and second scale element zones repeat periodically along the measuring axis direction according to a scale wavelength P. The second scale element zones include a second type of scale element having a characteristic that is varied in an absolute signal range along the scale pattern to provide a different respective eddy current response in different respective second scale element zones in the absolute signal range. The signal portion of the read head is responsive to the respective eddy currents to output absolute position signals having a signal characteristic that varies along the absolute signal range to uniquely indicate respective positions along the absolute signal range. In various implementations, the absolute signal range may be at least 10× the scale wavelength P.

In various implementations, the first type of scale element may include a plate feature (e.g., which is the same in each of the first scale element zones) and the second type of scale element may include a plate abatement feature (e.g., having a characteristic that is varied in each of the second scale element zones along the scale pattern). Alternatively, in other implementations the first type of scale element may include a plate abatement feature (e.g., which is the same in each of the first scale element zones along the scale pattern) and the second type of scale element may include a plate feature (e.g., having a characteristic that is varied in each of the second scale element zones). In either case, the plate feature may include a conductive plate area and the plate abatement feature may include at least one of a non-conductive area or a recessed area in a conductor.

In an implementation where the second type of scale element includes such a plate abatement feature, the characteristic that is varied may include at least one of a) the amount of the non-conductive area, b) the amount of the recessed area, or c) the recess depth of the recessed area. Alternatively, in an implementation where the second type of scale element includes a plate feature, the characteristic that is varied may include at least one of a) the amount of the plate area, or b) the plate height. In either case (i.e., whether the second type of scale element includes such plate features or plate abatement features), at least one characteristic that is varied in the absolute signal range may be varied according to a function (e.g., a linear function) along the absolute signal range.

In various implementations, in addition to the second type of scale element having a characteristic that is varied, the first type of scale element may also have a characteristic that is varied in the absolute signal range along the scale pattern to provide a different respective eddy current response in different respective first scale element zones in the absolute signal range. In a case where the first and second types of scale elements respectively include plate features and plate abatement features, or vice versa, both the plate features and plate abatement features may thus have characteristics that are varied in the absolute signal range along the scale pattern.

In various implementations, the second type of scale element may include a conductive region and the plate abatement feature may be formed in the conductive region. In various such configurations, the scale pattern may be formed in a scale portion including at least one of a printed circuit board, a patterned thin metal sheet including removed areas, a formed thin metal sheet including recesses formed by deformation of the thin metal sheet, or a metal material piece including recesses formed by removal of the metal material.

In one implementation, the position sensing device may have a maximum measuring range and the absolute signal range may extend over the maximum measuring range. In an alternative implementation, the absolute signal range may be designated as a first absolute signal range that extends over a first portion of the maximum measuring range, with a second absolute signal range that is similar to the first absolute signal range extending over a second portion of the maximum measuring range. In such an implementation, the scale may further include an absolute signal range identification portion that enables a determination of absolute position over the maximum measuring range. In various configurations, the absolute signal range identification portion may include at least one of a second scale pattern or binary code elements along the scale.

In various implementations, the signal portion and the scale pattern may be configured such that at least one output signal is periodic at the scale wavelength P and the signal characteristic may include an amplitude or DC offset of the periodic output signal. In various implementations, the signal portion and the scale pattern may be configured such that the signal characteristic of the absolute position signals varies linearly over the absolute signal range.

In various implementations, the signal portion of the read head may include one or more sensor portions that output position signals that vary depending on the eddy currents. As one specific illustrative example, four sensor portions (e.g., for which the output signals are designated as A, B, A' and B') may be included that are spaced by P/4 along the length of the scale. According to certain signal processing techniques, an incremental position signal may be able to be determined by one formula (e.g., $\tan^{-1}((A-A')/(B-B'))$) while an absolute position signal may be able to be determined by another formula (e.g., $A+B+A'+B'$).

It will be appreciated that a position sensing device including configurations such as those described herein will have various advantages over certain prior systems. For example, as will be described in more detail herein, such configurations may allow a single read head signal portion to provide signals that allow both incremental and absolute position signals to be determined. In other words, such configurations may not require a second scale track and corresponding second read head signal portion for reading the second scale track in order to determine both incremental and absolute position signals. Such configurations may also have lower power requirements (e.g., due to not requiring power for a second read head signal portion). In addition, in various implementations a narrower scale may be utilized in that a second co-linear scale track may not be required.

BRIEF DESCRIPTION OF THE DRAWINGS

FIGS. 3A-3C are side view diagrams of alternative embodiments of a scale pattern.

DETAILED DESCRIPTION

Figure 1:
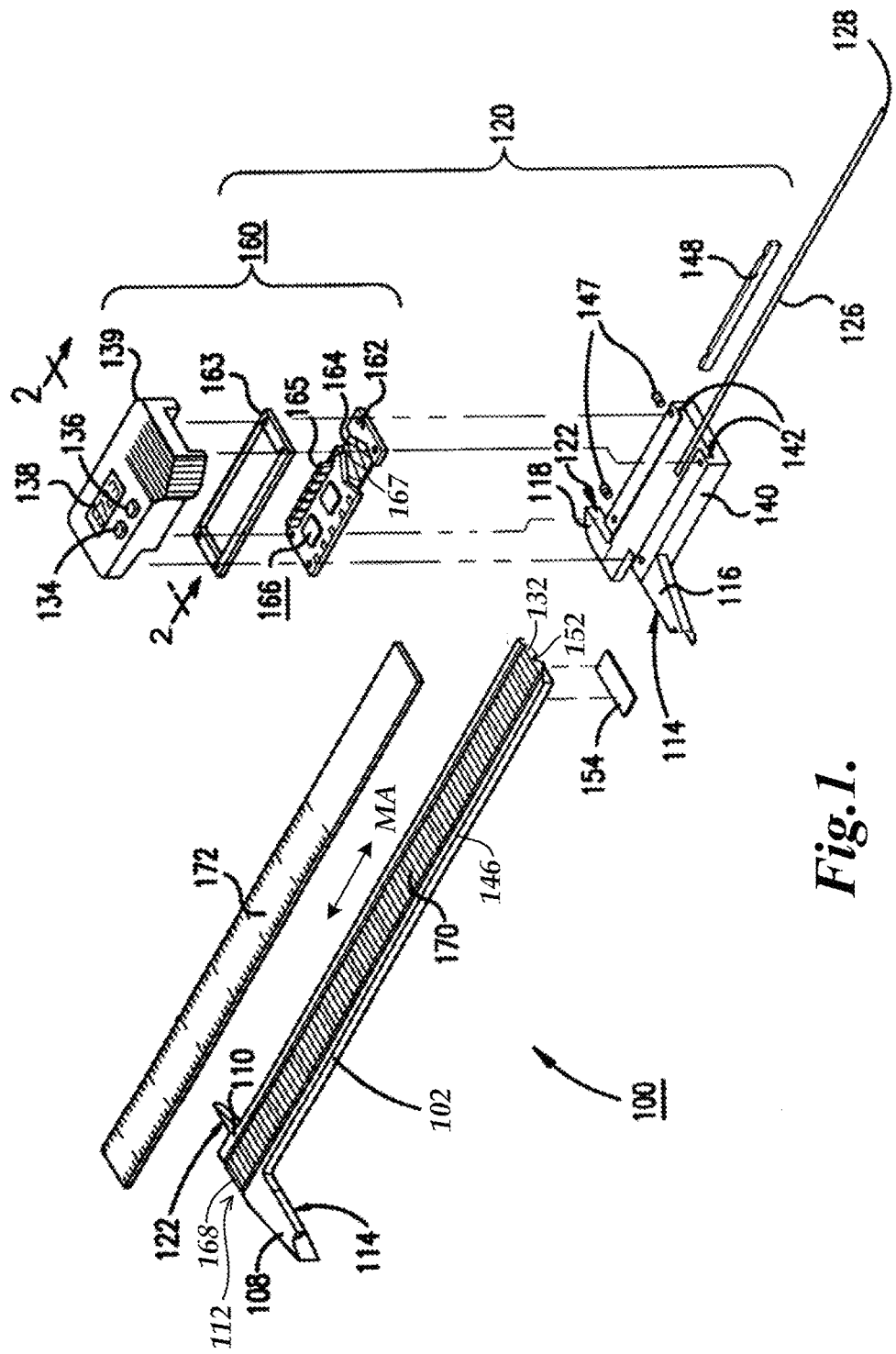
FIG. 1 is an exploded isometric view diagram of a hand tool type caliper including a scale with a scale pattern.

FIG. 1 is an exploded isometric view diagram of a hand tool type caliper 100 including a scale 102 with a scale pattern 170. As shown in FIG. 1, the scale 102 may include a substrate 168, which the scale pattern 170 may be formed on or attached to, and which may consist of a rigid or semi-rigid bar having a generally rectangular cross section. A pair of laterally projecting, fixed jaws 108 and 110 are integrally formed near a first end 112 of the scale 102. A corresponding pair of laterally projecting movable jaws 116 and 118 are formed on a slider assembly 120 which includes a read head 164.

The outside dimensions of an object are measured by placing the object between a pair of engagement surfaces 114 on the jaws 108 and 116. Similarly, the inside dimensions of an object are measured by placing the jaws 110 and 118 within an object. The engagement surfaces 122 of the jaws 110 and 118 are positioned to contact the surfaces on the object to be measured. The engagement surfaces 122 and 114 are positioned so that when the engagement surfaces 114 of the jaws 108 and 116 are contacting each other, the engagement surfaces 122 of the jaws 110 and 118 are aligned with each other. In this position, the zero position (not shown), both the outside and inside dimensions measured by the caliper 100 should be zero.

The caliper 100 also includes a depth bar 126 which is attached to the slider assembly 120. The depth bar 126 projects longitudinally from the scale 102 and terminates at an engagement end 128. The length of the depth bar 126 is such that the engagement end 128 is flush with a second end 132 of the scale 102 when the caliper 100 is at the zero position. By resting the second end 132 of the scale 102 on a surface in which a hole is formed and extending the depth bar 126 into the hole until the end 128 touches the bottom of the hole, the caliper 100 is able to measure the depth of the hole.

Whether a measurement is made using the outside measuring jaws 108 and 116, the inside measuring jaws 110 and 118, or the depth bar 126, the measured dimension is displayed on a conventional digital display 138, which is mounted in a cover 139 of the slider assembly 120. A pair of push button switches 134 and 136 are also mounted in the cover 139. The switch 134 turns on and off a signal processing and display electronic circuit 166 of the slider assembly 120. The switch 136 is used to reset the display 138 to zero.

As shown in FIG. 1, the slider assembly 120 includes a base 140 with a guiding edge 142. The guiding edge 142 contacts a side edge 146 of the scale 102 when the slider assembly 120 straddles the scale 102. This ensures accurate operation of the caliper 100. A pair of screws 147 bias a resilient pressure bar 148 against a mating edge of the scale 102 to eliminate free play between the slider assembly 120 and the scale 102.

The depth bar 126 is inserted into a depth bar groove 152 formed on an underside of the scale 102. The depth bar groove 152 extends along the underside of the scale 102 to provide clearance for the depth bar 126. The depth bar 126 is held in the depth bar groove 152 by an end stop 154. The end stop 154 is attached to the underside of the scale 102 at the second end 132. The end stop 154 also prevents the slider assembly 120 from inadvertently disengaging from the scale 102 at the second end 132 during operation.

The slider assembly 120 also includes a pickoff assembly 160 mounted on the base 140 above the scale 102. Thus, the base 140 and pickoff assembly 160 move as a unit. The pickoff assembly 160 includes a substrate 162, such as a conventional printed circuit board. The substrate 162 bears an eddy current read head 164 on its lower surface. A signal processing and display electronic circuit 166 is mounted on an upper surface of the substrate 162. A resilient seal 163 is compressed between the cover 139 and the substrate 162 to prevent contamination of the signal processing and display electronic circuit 166. The underside of the read head 164 is covered by a thin, durable, insulative coating 167 (e.g., which in one specific illustrative example may be approximately 50 mm thick).

The scale 102 includes a scale pattern 170 extending along the measuring axis direction MA. As will be described in more detail below with respect to FIG. 2, the scale pattern 170 may include first and second scale element zones arranged periodically along the measuring axis direction MA, and which may respectively include first and second types of scale elements. A protective insulating layer 172 (e.g., which in one specific illustrative example may be at most approximately 100 mm thick) may cover the scale pattern 170. The protective layer 172 can include printed markings, as shown in FIG. 1.

The slider assembly 120 carries the read head 164 so that it is slightly separated from the scale 102 by an air gap formed between the insulative coatings 167 and 172. In one specific illustrative example the air gap may be approximately on the order of 0.5 mm. Together, the read head 164 and the scale pattern 170 form an eddy current transducer which operates in one implementation by generating changing magnetic fields. The changing magnetic fields induce circulating currents, known as eddy currents, in some of the scale elements of the scale pattern 170 that are placed within the changing magnetic field, as will be described in more detail below.

Figure 2:
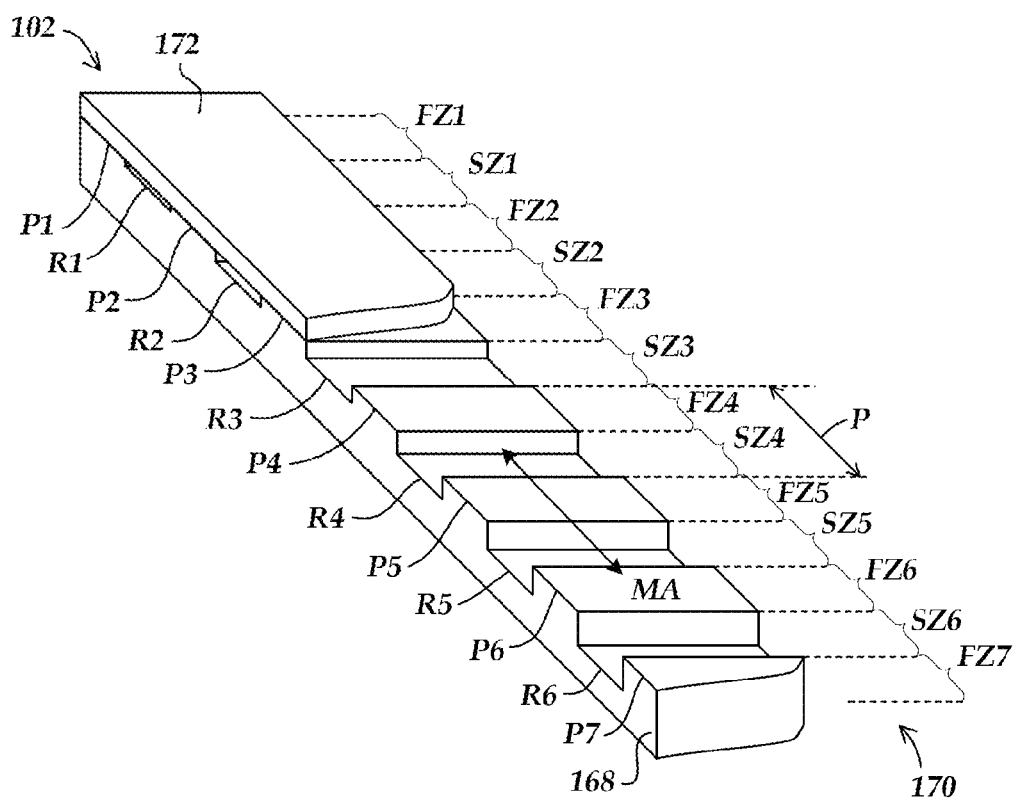
FIG. 2 is an isometric view diagram of a portion of the scale of FIG. 1 illustrating scale elements in first and second scale element zones of the scale pattern.

FIG. 2 is an isometric view diagram of a portion of the scale 102 of FIG. 1 illustrating scale elements in a plurality of first and second scale element zones of the scale pattern 170. In FIG. 2, an illustrated plurality of first scale element zones FZ1-FZ7 is arranged periodically along the measuring axis direction MA. An illustrated plurality of second scale element zones SZ1-SZ6 is also arranged periodically along the measuring axis direction MA and is interleaved with the plurality of first periodic scale element zones FZ1-FZ7 such that the first and second scale element zones repeat periodically along the measuring axis direction MA according to a scale wavelength P. In the example of FIG. 2, the areas of each of the respective first and second scale element zones may be approximately the same, such that the dimension along the measuring axis direction MA of each is approximately equal to ½ of the scale wavelength P. It will be appreciated that in other embodiments the areas and widths of the first and second scale element zones may differ.

Each of the first scale element zones includes a first type of scale element and each of the second scale element zones includes a second type of scale element. More specifically, in the example of FIG. 2, the first type of scale element that is included is a plate feature, wherein each of the illustrated first scale element zones FZ1-FZ7 includes a respective conductive plate area P1-P7. The second type of scale element is a plate abatement feature, wherein each of the illustrated second scale element zones SZ1-SZ6 includes a respective recessed area R1-R6. In another implementation, as another example of a plate abatement feature, a non-conductive area could be included within each of the second scale element zones SZ1-SZ6.

As will be described in more detail below, the recessed areas R1-R6 each have a characteristic that is varied in an absolute signal range along the scale pattern to provide a different respective eddy current response in different respective second scale element zones SZ1-SZ6 in an absolute signal range. More specifically, as illustrated in FIG. 2, the recess depth of each of the recessed areas R1-R6 is shown to increase from the first illustrated recessed area R1 to the last illustrated recessed area R6. As will be described in more detail below, this difference in recessed depth provides different eddy current responses, and a signal portion of a read head that is responsive to the respective eddy currents may correspondingly output absolute position signals having a signal characteristic that varies along an absolute signal range to uniquely indicate respective positions along the absolute signal range.

In various implementations, the scale 102 and/or scale pattern 170 may be fabricated utilizing various techniques. For example, in one implementation the substrate 168 may be formed from a conducting bulk material (e.g., aluminum). In such a case, the recessed areas R1-R6 may be formed by making progressively deeper horizontal cuts in the substrate 168. The substrate 168 may then be covered by the protective layer 172 described above with respect to FIG. 1.

FIGS. 3A-3C are side view diagrams of different alternative embodiments of scale patterns 370A-370C. It will be appreciated that the scale patterns 370A-370C may have certain characteristics that are similar to those of the scale pattern 170 of FIG. 2, and will be understood to operate similarly except as otherwise described below. As shown in FIGS. 3A-3C, the scale patterns 370A-370C each include a plurality of first scale element zones FZ1-FZ9 and a plurality of second scale element zones SZ1-SZ8. Similar to the scale pattern 170, in the scale patterns 370A-370C the illustrated plurality of first scale element zones FZ1-FZ9 and the illustrated plurality of second scale element zones SZ1-SZ8 are arranged periodically along the measuring axis direction MA. The first and second scale element zones are also interleaved such that the first and second scale element zones repeat periodically along the measuring axis direction MA according to a scale wavelength P. The width of each of the first and second scale element zones is approximately the same, such that the width of each is approximately equal to ½ of the scale wavelength P.

As shown in FIG. 3A, in the scale pattern 370A each of the illustrated first scale element zones FZ1-FZ9 includes a respective conductive plate area P1A-P9A, and each of the illustrated second scale element zones SZ1-SZ8 includes a respective recessed area R1A-R8A. The recess depth of each of the recessed areas R1A-R8A is shown to increase from the first illustrated recessed area R1 to the last illustrated recessed area R8 according to a linear function, as indicated by a straight dotted-line arrow 310A. The conductive plate areas P1A-P9A are shown to be the same in each of the first scale element zones FZ1-FZ9. As will be described in more detail below with respect to FIGS. 6A and 7A, in one implementation this configuration results in an output signal from a read head sensor portion for which the upper signal peaks generally fall along a straight horizontal line, while the lower signal peaks generally fall along a curved line, and a resulting absolute position signal characteristic is also curved.

As shown in FIG. 3B, in the scale pattern 370B each of the illustrated first scale element zones FZ1-FZ9 includes a respective conductive plate area P1B-P9B, and each of the illustrated second scale element zones SZ1-SZ8 includes a respective recessed area R1B-R8B. The recess depth of each of the recessed areas R1B-R8B is shown to increase from the first illustrated recessed area R1 to the last illustrated recessed area R8 according to a curved function, as indicated by a curved dotted-line arrow 310B. The conductive plate areas P1B-P9B are shown to be the same in each of the first scale element zones FZ1-FZ9. As will be described in more detail below with respect to FIGS. 6B and 7B, in one implementation this configuration results in an output signal from a read head sensor portion for which the upper signal peaks generally fall along a straight horizontal line, while the lower signal peaks generally fall along a straight line that is angled downward, and the resulting absolute position signal is also generally angled downward but is also somewhat periodic at the scale wavelength P.

As shown in FIG. 3C, in the scale pattern 370C each of the illustrated first scale element zones FZ1-FZ9 includes a respective conductive plate area P1C-P9C, and each of the illustrated second scale element zones SZ1-SZ8 includes a respective recessed area R1C-R8C. The recess depth of each of the recessed areas R1C-R8C is shown to increase from the first illustrated recessed area R1C to the last illustrated recessed area R8C according to a curved function, as indicated by a curved dotted-line arrow 310C. In addition, in this implementation a height of the conductive plate areas P1C-P9C is shown to decrease from the first illustrated conductive plate area P1C to the last conductive plate area P9C according to an approximately linear function, as indicated by a straight dotted-line arrow 309C. However, it will be appreciated that a desired nonlinear function may alternatively be used, as indicated in other embodiments herein. It will be appreciated that even though the height of the conductive plate areas decreases, the read head will continue to move at a level L1 with respect to the scale pattern 370C. For example, once the read head is over the conductive plate area P9C that has a height of L2, the distance of the read head will be the normal gap distance plus a distance DL1L2=L1−L2. As will be described in more detail below with respect to FIGS. 6C and 7C, in one implementation this configuration of the scale pattern 370C results in an output signal from a read head sensor portion for which the upper signal peaks generally fall along a straight line that is angled downward, and the lower signal peaks generally fall along a straight line that is similarly angled downward, with the peak-to-peak differences thus having a relatively constant amplitude along the measuring range, and the resulting absolute position signal also being approximately linear and angled downward.

Figure 4:
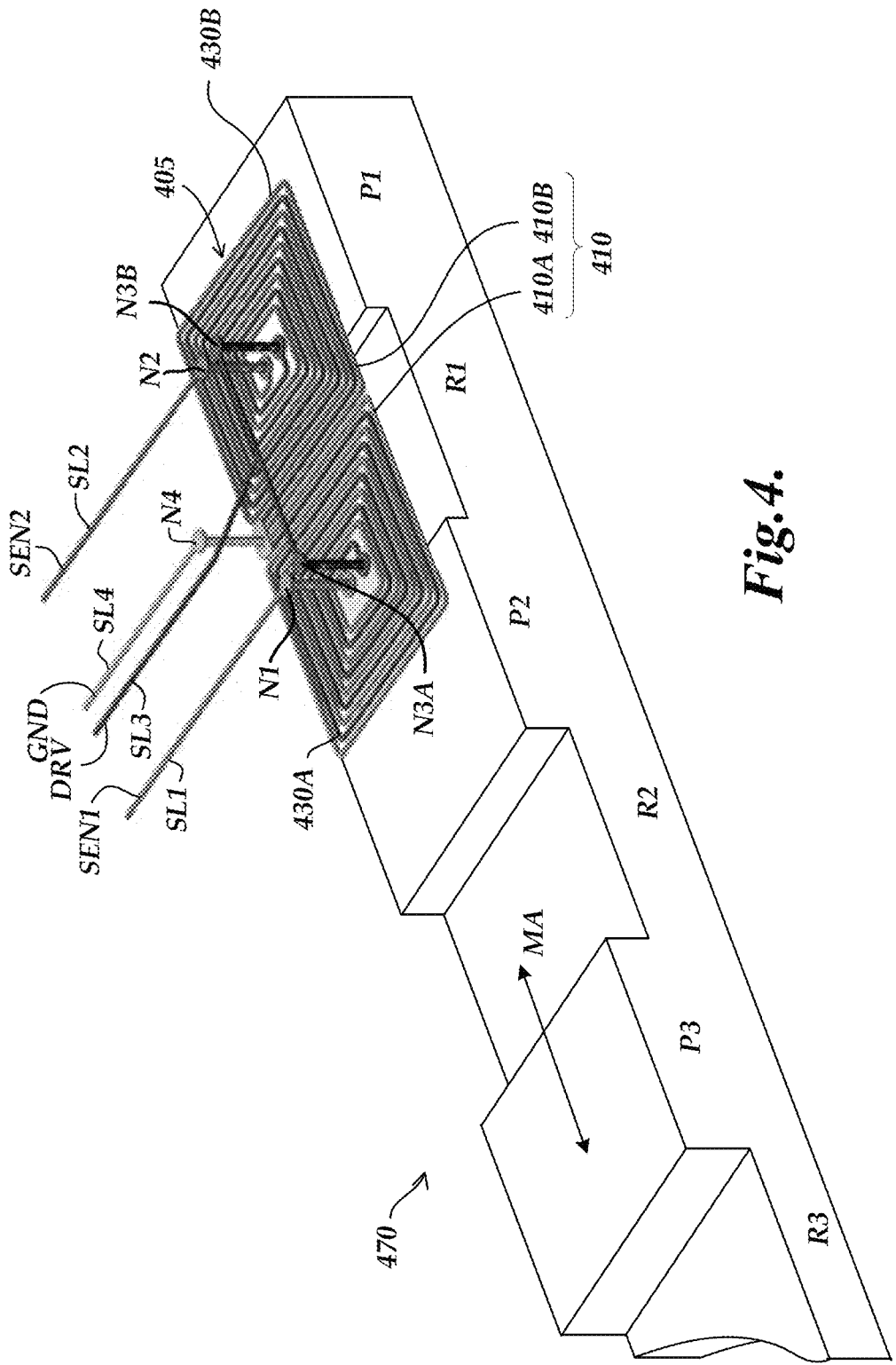
FIG. 4 is an isometric diagram of portions of a read head for sensing a position relative to a scale pattern.

FIG. 4 is an isometric diagram of portions of a read head 405 for sensing a position relative to a scale pattern 470. It will be appreciated that the scale pattern 470 may have similar characteristics and will be understood to operate similarly to one or more of the scale patterns 170 and 370A-370C, except as otherwise described below. As shown in FIG. 4, the read head 405 includes excitation portions 430A and 430B for exciting eddy currents in the scale pattern 470, and first and second sensor portions 410A and 410B that output position signals that vary depending on the eddy currents. The first and second sensor portions 410A and 410B are included as part of a signal portion 410 of the read head 405. While for purposes of simplifying the present explanation the signal portion 410 is illustrated as having only two sensor portions, it will be appreciated that in other implementations a different number of sensor portions may be utilized (e.g., four sensor channels spaced by P/4), as will be described in more detail below with respect to FIGS. 6A-6C and 7A-7C.

As will be described in more detail below, the first and second sensor portions 410A and 410B and the excitation portions 430A and 430B of the read head 405 may in one implementation consist of co-planar inductive coils that are fabricated in a metal layer of a printed circuit board (e.g., a printed circuit board 162 of the slider assembly 120 of FIG. 1). In one implementation, the printed circuit board may include at least two metal layers. As illustrated in FIG. 4, a first or top layer may include traces for connecting a series of nodes N1-N4 to position sensing and driving circuitry (e.g., as may be included in the signal processing and display electronic circuit 166 of the slider assembly 120).

The node N1 is coupled to a signal line SL1 which may provide a position signal SEN1. The node N2 is coupled to a signal line SL2 which may provide a position signal SEN2. The nodes N3A and N3B are coupled together and may be referenced as a common node N3 which is coupled to a signal line SL3 which may receive an excitation signal DRV. The node N4 is coupled to a signal line SL4 which is coupled to ground GND.

As further shown in FIG. 4, a second or lower metal layer of the printed circuit board may include the first and second sensor portions 410A and 410B and the excitation portions 430A and 430B (e.g., as printed co-planar inductive coils). The excitation portions 430A and 430B may in some instances be referenced together as a single excitation portion of the read head 405. As illustrated in FIG. 4, one end of the first sensor portion 410A is coupled to the node N1 (i.e., as providing the position signal SEN1) while the other end is coupled to the node N4 (i.e., as connected to ground GND). One end of the second sensor portion 410B is coupled to the node N2 (i.e., as providing the position signal SEN2) while the other end is coupled to the node N4 (i.e., as connected to ground GND). One end of the excitation portion 430A is coupled to the node N3A (i.e., as receiving the excitation signal DRV) while the other end is coupled to the node N4 (i.e., as connected to ground GND). One end of the excitation portion 430B is coupled to the node N3B (i.e., as receiving the excitation signal DRV) while the other end is coupled to the node N4 (i.e., as connected to ground GND). The operation of the read head 405 and the scale pattern 470 will be described in more detail below with respect to FIG. 5A.

As shown in FIG. 4, the scale pattern 470 includes conductive plate areas P1-P3 in respective first scale element zones, and recessed areas R1-R3 in respective second scale element zones. As will be described in more detail below with respect to FIG. 5A, when the read head 405 is moved so that one of the recessed areas R1-R3 becomes primarily centered under the sensor portion 410A, the respective recessed area may primarily affect the position signal SEN1. Similarly, if the read head is moved so that one of the recessed areas R1-R3 becomes primarily centered under the sensor portion 410B, the respective recessed area may primarily affect the position signal SEN2. As will also be described in more detail below with respect to FIG. 5A, the differential between the position signals SEN1 and SEN2 may be utilized to determine the position of the scale pattern 470 relative to the read head 405. A differential may provide for improved linearity and robustness from common-mode errors.

It will be appreciated that while for simplicity the example of FIG. 4 has illustrated a configuration in which the read head signal portion 410 includes two sensor portions 410A and 410B that are spaced by P/2 along the length of the scale, in other implementations different numbers of sensor portions may be included (e.g., 1, 3, 4, etc.) For example, in another configuration the signal portion of the read head may include four sensor portions (e.g., for which the output signals are designated as A, B, A' and B') that are spaced by P/4 along the length of the scale. As will be described in more detail below with respect to FIGS. 6A-6C and 7A-7C, according to certain signal processing techniques, in such an example configuration an incremental position signal may be able to be determined by one formula (e.g., $\tan^{-1}((A-A')/(B-B'))$) while an absolute position signal may be able to be determined by another formula (e.g., A+B+A'+B').

Figure 5A:
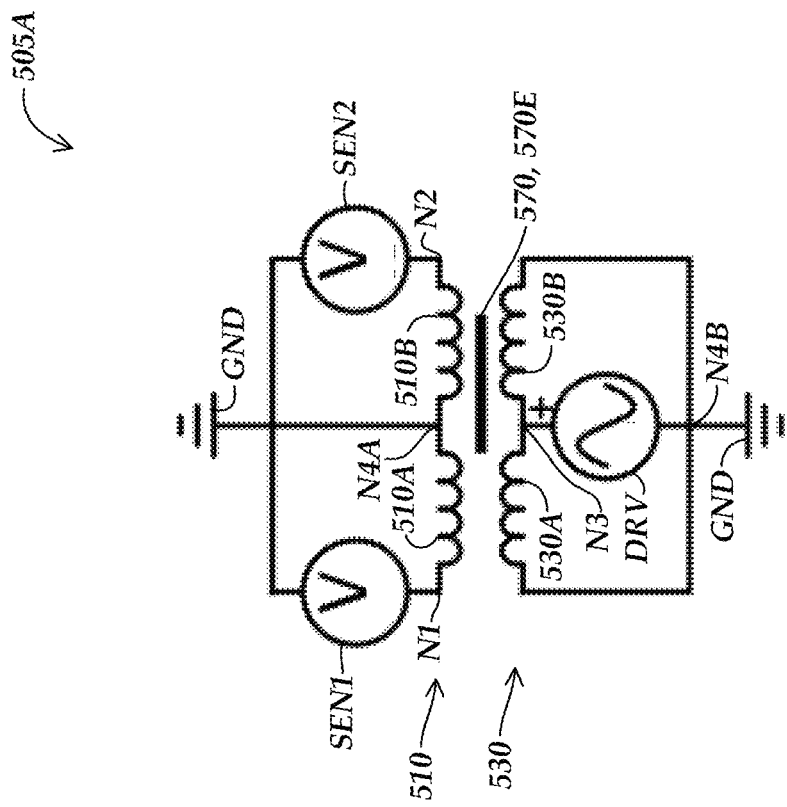
FIGS. 5A and 5B are schematic diagrams illustrating various operating principles of alternative embodiments of a read head.
Figure 5B:
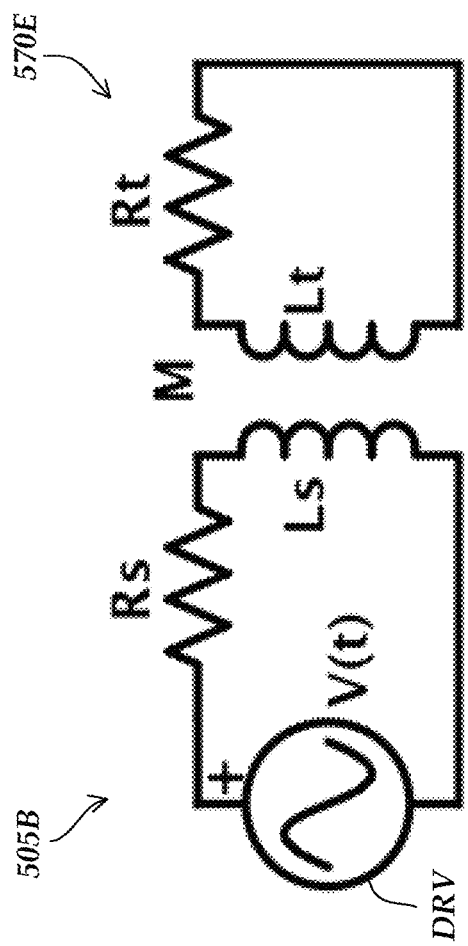

FIGS. 5A and 5B are schematic diagrams illustrating various operating principles of alternative embodiments of a read head. FIG. 5A is a schematic diagram illustrating various operating principles of a read head 505A, which may be illustrative of the operating principles of the read head 405 of FIG. 4. As shown in FIG. 5A, in one implementation the read head 505A may include first and second sensor portions 510A and 510B and excitation portions 530A and 530B. The first and second sensor portions 510A and 510B are included as part of a signal portion 510, while the excitation portions 530A and 530B are included as part of an excitation portion 530 of the read head 505A. In one specific example implementation, the first and second sensor portions 510A and 510B and the excitation portions 530A and 530B may all consist of planar spiral coils that are printed on a printed circuit board (e.g., the printed circuit board 162 of the slider assembly 120 of FIG. 1). In various implementations, the sensor portions and excitation portions may be fabricated in the same or different metal layers of the printed circuit board. For example, in a printed circuit board with two metal layers, the sensor portions and excitation portions may all be fabricated in the same metal layer (e.g., as illustrated by the configuration of FIG. 4). As another example, in a printed circuit board with four metal layers, the sensor portions and excitation portions may be fabricated in different metal layers. In one specific example implementation, a scale pattern 570 including a plurality of scale elements 570E may be formed from a conducting bulk material (e.g., aluminum).

In one specific example implementation, the excitation portions 530A and 530B may be driven (e.g., by an excitation signal DRV at the node N3) with a selected waveform pattern (e.g., sinusoidal, quasi-sinusoidal with a pulsed resonant circuit, etc.) The driving of the excitation portions 530A and 530B may induce voltage on the first and second sensor portions 510A and 510B, respectively. In one specific example implementation, eddy currents in the scale element 570E may affect the inductive coupling of the excitation portions 530A and 530B to the first and second sensor portions 510A and 510B, respectively, depending on the linear position of the scale element 570E. The first and second sensor portions 510A and 510B may thus in certain implementations be referenced as variable inductance elements, wherein the inductance depends on the position of the scale element 570E.

As described above with respect to FIGS. 2-4, the scale pattern 570 may include first and second types of scale elements 570E (e.g., plate areas and recessed areas) which alternate periodically along the measuring axis direction MA. For purposes of simplifying the present illustration and explanation, in FIG. 5A only a single scale element 570E is illustrated (e.g., representing either a plate area or a recessed area) that is proximate to the first and second sensor portions 510A and 510B and the excitation portions 530A and 530B.

As a specific illustrative example, if the scale element 570E is primarily aligned with the excitation portion 530A and the first sensor portion 510A, it will primarily affect that inductive coupling. Conversely, if the scale element 570E is primarily aligned with the excitation portion 530B and the second sensor portion 510B, it will primarily affect that inductive coupling. The effect on the inductive coupling will correspondingly affect the magnitudes of the respective position signals SEN1 and SEN2. In this manner, the difference between the position signals SEN1 and SEN2 (i.e., as measured at the nodes N1 and N2), may be indicative of the position of the scale element 570E and the corresponding scale pattern 570. It will be appreciated that one particular advantage of a configuration utilizing an eddy current read head in this manner is that the position sensing device may generally be made to be insensitive to contaminants such as cutting oil, water, other fluids, dust, ferromagnetic particles, etc. In addition, the disclosed configuration may use less power and may be less expensive to produce than other sensor configurations that could be utilized for a position sensing device.

In one implementation, the excitation portions 530A and 530B may consist of two adjacent, co-planar coils that are mirror images of each other and which share a common current source (e.g., from the excitation signal DRV at node N3) and a common ground (e.g., at node N4). In such an implementation, the current may flow in opposite directions through the excitation portions 530A and 530B (i.e., counterclockwise and clockwise, respectively) so that the total inductance is maximized. Fabricating the excitation portions 530A and 530B to be mirror images of each other also helps ensure that the position signals SEN1 and SEN2 will be relatively symmetric. The excitation portions 530A and 530B may also be fabricated in the metal layer of the printed circuit board with the greatest thickness so as to minimize resistance and correspondingly minimize the amount of driving power required. In one implementation, the excitation portions 530A and 530B may be fabricated in the metal layer that will be closest to the scale pattern 570 during operation.

In various implementations, the width of the scale pattern 570 may be made to be slightly larger than the width of the read head 505A, so as to accommodate for various misalignments that may occur. In addition, the length of each scale element 570E may be approximately half of the total combined length of the read head 505A, so as to maximize the range and linearity of the response signal (e.g., as determined by the differential between the position signals SEN1 and SEN2).

While the implementation shown in FIG. 5A shows first and second sensor portions 510A and 510B which provide separate signals, it should be appreciated that in alternative implementations, the first and second sensor portions 510A and 510B may be combined into a single coil with a single output, or additional sensor portions may be included that each provide separate signals (e.g., a four-sensor portion configuration). As will be described in more detail below with respect to FIG. 5B, in another alternative implementation, a single conductive circuit may perform the function of both an excitation portion and a sensor portion, and a change in complex impedance within this sensor portion may provide a position signal.

FIG. 5B is a schematic diagram illustrating various operating principles of a read head 505B in which a single conductive circuit may perform the function of both an excitation portion and a sensor portion. In various implementations, a read head may include one or more such conductive circuits (e.g., four conductive circuits spaced by P/4). Similar to FIG. 5A, for purposes of simplifying the present illustration and explanation, only a single scale element circuit 570E is described (e.g., representing either a plate area or a recessed area) that is proximate to the read head 505B, which is illustrated as including only a single conductive circuit. As shown in FIG. 5B, the read head 505B and target scale element 570E can thus be modeled as a simple two-part circuit, as described in more detail in J. Lefebvre, C. Mandache and J. Letarte, "Pulsed eddy current empirical modeling," *Advances in Signal Processing for Non Destructive Evaluation of Materials*, Quebec City, Canada, 2006. As described, some of the key variables that affect the impedance of an eddy current sensor are the physical dimensions and composition of the sensor coil; the drive frequency ($\omega$); the conductivity of the target ($\sigma$); the magnetic permeability of the target ($\mu$); the irregularities in the target; and the gap and alignment of the sensor to the target.

As shown in FIG. 5B, the illustrated circuit of the read head 505B on the left functions as both the excitation portion and the sensor portion, and has an inductance $L_s$, resistance $R_s$, and is driven by a voltage source V(t). The scale element 570E on the right is illustrated as a target circuit and has an effective inductance $L_t$ and resistance $R_t$. The effective target values for the scale element 570E depend on $\sigma$, $\mu$, $\omega$, and the system geometry. The coupling of the two circuits depends on the sensor-to-target proximity and is reflected in the mutual inductance $M=k\sqrt{L_s L_t}$. The value of k is $0 \leq k \leq 1$ and increases as the gap decreases. A change in complex impedance in the read head 505B due to the coupling with the scale element 570E may provide a corresponding position signal that may be utilized to determine a position of the read head 505B relative to the scale element 570E and the corresponding scale pattern 570.

Figures 6A, 6B, 6C:
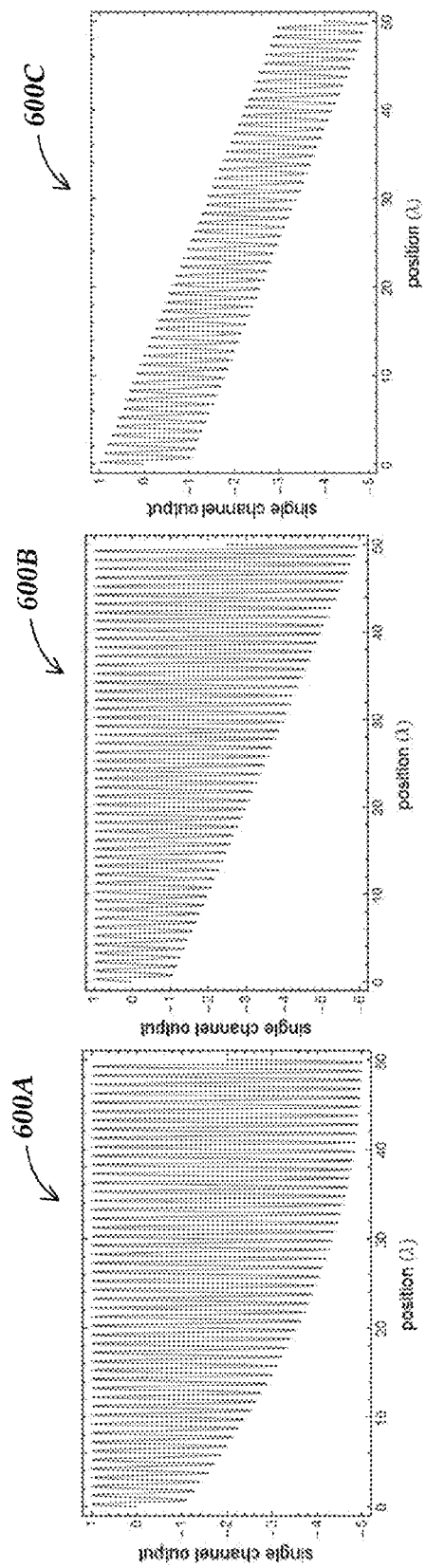
FIGS. 6A-6C are diagrams of output signals from a read head as used in combination with the scale patterns of FIGS. 3A-3C, respectively.
Figures 7A, 7B, 7C:
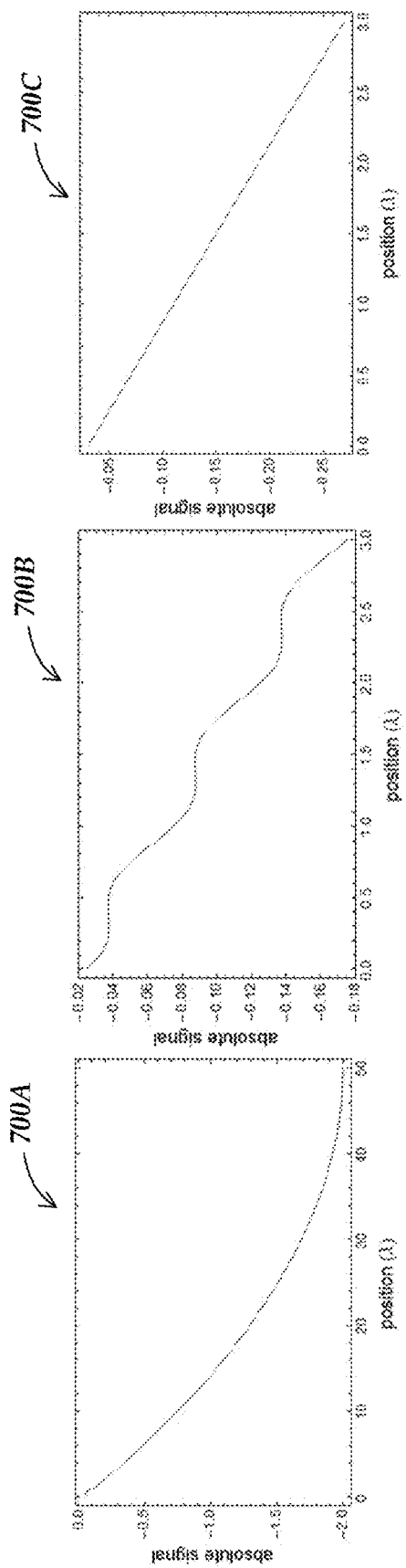
FIGS. 7A-7C are diagrams of resulting absolute position signals as corresponding to the output signals of FIGS. 6A-6C and scale patterns of FIGS. 3A-3C, respectively.

FIGS. 6A-6C are diagrams of output signals from a read head as used in combination with the scale patterns of FIGS. 3A-3C, respectively, and FIGS. 7A-7C are diagrams of resulting absolute position signals. In order to better illustrate the characteristics of the output signals of FIGS. 6A-6C, the signals are shown for extended versions of the scale patterns of FIGS. 3A-3C. More specifically, the signals are shown for versions of the scale patterns that cover 50 scale wavelengths P, including 50 each of the first and second scale element zones FZ and SZ, with the scale patterns continuing according to the same characteristics described above with respect to FIGS. 3A-3C. As a specific illustrative example, a position sensing device utilizing such scale patterns may be defined as having a 50-scale wavelength maximum measuring range over which the absolute signal range extends. It will be appreciated that in other implementations, the scale pattern and corresponding maximum measuring range may extend over a larger or smaller number of scale wavelengths.

In various implementations, the output signals of FIGS. 6A-6C may be representative of the output of one sensor portion of the signal portion of the read head. As described above with respect to FIG. 4, the signal portion of the read head may include one or more sensor portions that output position signals that vary depending on the eddy currents. As one specific illustrative example, four sensor portions (e.g., for which the output signals are designated as A, B, A' and B') may be included that are spaced by P/4 along the length of the scale. The signals of FIGS. 6A-6C may correspondingly represent one of these output signals from one of the sensor portions.

According to certain signal processing techniques, an incremental position signal may be able to be determined by one formula (e.g., $\tan^{-1}((A-A')/(B-B'))$) while an absolute position signal (e.g., as indicated by the signals of FIGS. 7A-7C) may be able to be determined by another formula (e.g., A+B+A'+B'). It will be appreciated that such formulas may be implemented by any combination of signal processing and physical circuit combinations (e.g., the absolute position signal which is a sum of the signals may be determined from signal processing and/or a physical circuit combination of the signal lines).

FIG. 6A illustrates a read head output signal 600A and FIG. 7A illustrates a corresponding absolute position signal 700A corresponding to the scale pattern 370A of FIG. 3A. As described above with respect to FIG. 3A, in the scale pattern 370A the recess depth of each of the recessed areas R1A-R8A increases from the first illustrated recessed area R1 to the last illustrated recessed area R8 according to a linear function, while the conductive plate areas P1A-P9A remain the same. As shown in FIG. 6A, this configuration results in the output signal 600A from the read head signal portion (e.g., from a single sensor portion of the read head signal portion) wherein the upper signal peaks (e.g., corresponding to the read head sensor portion being centered over each of the conductive plate areas) generally fall along a straight horizontal line, while the lower signal peaks (e.g., corresponding to the read head sensor portion being centered over each of the recessed areas) generally fall along a curved line, depending on the nonlinear response of the read head signals to an increasing gap, for example. As shown in FIG. 7A, the resulting absolute position signal 700A is also curved with the slope becoming flatter near the end of the scale pattern 370A, which correspondingly increases the difficulty for accurately determining the absolute position near the end of the scale pattern 370A.

FIG. 6B illustrates a read head output signal 600B and FIG. 7B illustrates a corresponding absolute position signal 700B corresponding to the scale pattern 370B of FIG. 3B. As described above with respect to FIG. 3B, in the scale pattern 370B the recess depth of each of the recessed areas R1B-R8B increases from the first illustrated recessed area R1 to the last illustrated recessed area R8 according to a curved function, while the conductive plate areas P1B-P9B remain the same.

As shown in FIG. 6B, this configuration results in the output signal 600B from the read head signal portion wherein the upper signal peaks (e.g., corresponding to the read head sensor portion being centered over each of the conductive plate areas) generally fall along a straight horizontal line, while the lower signal peaks (e.g., corresponding to the read head sensor portion being centered over each of the recessed areas) generally fall along a straight line that is angled downward. As shown in FIG. 7B (for which the x-axis has been reduced to three scale wavelengths P in order to better illustrate the signal characteristics), the resulting absolute position signal 700B is also generally angled downward in a similar manner but is also somewhat periodic at the scale wavelength P. It will be appreciated that the absolute position signal 700B is also relatively consistent in comparison to the absolute position signal 700A (i.e., the overall signal 700B does not have a significantly decreasing slope near the end of the scale patterns 370B).

FIG. 6C illustrates a read head output signal 600C and FIG. 7C illustrates a corresponding absolute position signal 700C corresponding to the scale pattern 370C of FIG. 3C. As described above with respect to FIG. 3C, in the scale pattern 370C the recess depth of each of the recessed areas R1C-R8C increases from the first illustrated recessed area R1 to the last illustrated recessed area R8 according to a curved function, and a height of the conductive plate areas P1C-P9C decreases from the first illustrated conductive plate area P1C to the last conductive plate area P9C according to an approximately linear function, or nonlinear function, if desired. As shown in FIG. 6C, this configuration results in the output signal 600C from the read head signal portion wherein the upper signal peaks (e.g., corresponding to the read head sensor portion being centered over each of the conductive plate areas) generally fall along a straight line that is angled downward, and the lower signal peaks (e.g., corresponding to the read head sensor portion being centered over each of the recessed areas) generally fall along a straight line that is similarly angled downward, with the peak-to-peak differences thus having a relatively constant amplitude along the measuring range. As shown in FIG. 7C, the resulting absolute position signal 700C is also generally linear and angled downward.

It will be appreciated that the ability of a single read head signal portion to provide signals that allow both incremental and absolute position signals to be determined is a further advantage of the position sensing device described herein. More specifically, in order to determine both incremental and absolute position signals, configurations such as those described herein do not require a second scale track and corresponding second read head signal portion for reading the second scale track. Such configurations may also have lower power requirements (e.g., due to not requiring power for a second read head signal portion). In addition, in various implementations a narrower scale may be utilized in that a second co-linear scale track is not required.

It should be appreciated that other read head(s), circuits and signal processing may be in used with the various scales disclosed herein, as alternatives to those outlined above. For example, various read heads and circuits disclosed in the previously incorporated '494 and '389 patent references may be adapted to work in conjunction with various scale configurations disclosed herein, in order to provide incremental and absolute position signals according to principles disclosed herein. Thus, it will appreciated that the read heads, circuits and signal processing outlined above are exemplary only, and not limiting.

Figure 8A:
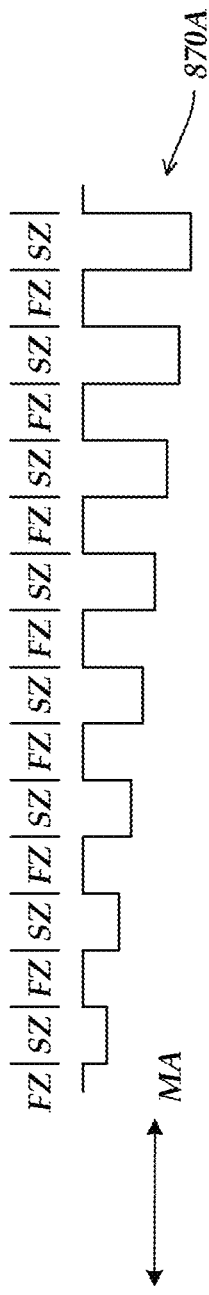
FIGS. 8A-8G are diagrams of alternative embodiments of scale patterns in addition to those of FIGS. 3A-3C.

FIGS. 8A-8G are diagrams of alternative embodiments of scale patterns 870A-870G, respectively, which are illustrated in addition to those previously described with respect to FIGS. 3A-3C. Each of the scale patterns 870A-870G includes respective first scale element zones FZ and second scale element zones SZ. As shown in FIG. 8A, a side view diagram of the scale pattern 870A is illustrated. In the scale pattern 870A, each of the first scale element zones FZ includes a respective conductive plate area of the same height relative to the overall scale pattern 870A. Each of the second scale element zones SZ includes a respective recessed area. The recess depth of each of the recessed areas is shown to increase from left to right along the scale pattern according to a linear function, similar to the configuration of FIG. 3A.

Figure 8B:
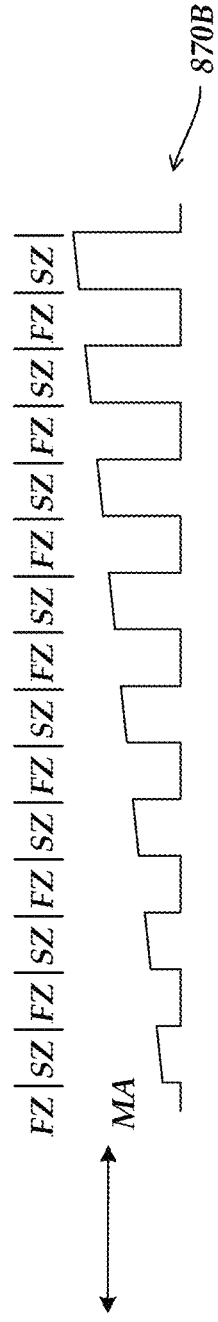

As shown in FIG. 8B, a side view diagram of the scale pattern 870B is illustrated. In the scale pattern 870B, each of the first scale element zones FZ includes a respective recessed area of the same depth relative to the bottom of the overall scale pattern 870B. Each of the second scale element zones SZ includes a respective conductive plate area. The height of each of the conductive plate areas is shown to increase from left to right along the scale pattern according to a linear function. It will be appreciated that while certain other scale patterns described above have had a plate abatement feature (e.g., a recessed area) as the second type of scale element that was varied, the scale pattern 870B illustrates a configuration in which the first type of scale element is a plate abatement feature that remains constant while the second type of scale element is a plate feature for which the plate height is varied.

FIGS. 8C-8G are plan view diagrams of the scale patterns 870C-870G, respectively. Each of the scale patterns 870C-870G is illustrated relative to a sensor/scale track width W1C-W1G, respectively. In each of the scale patterns 870C-870G, the dark areas may represent varying plate or recessed areas, depending on the implementation. For example, in various implementations the dark areas may represent holes that are machined, formed through electrical discharge machining in a metal block, etched in a PCB, stamped in a thin metal sheet, etc. As another example, in various other implementations the dark areas may represent conductive plate areas formed on a PCB that is non-conductive elsewhere, or the remainder machined, stamped or etched to be recessed, etc.

Figure 8C:
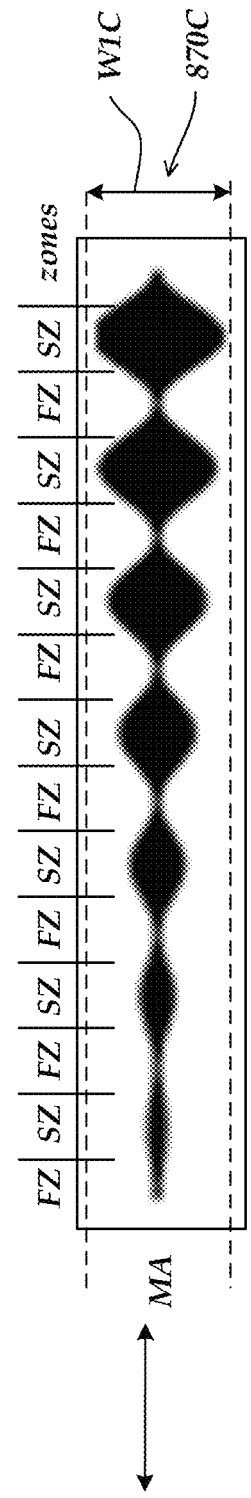
Figure 8D:
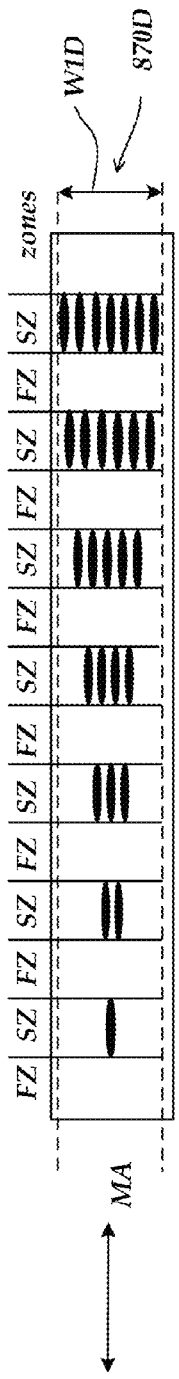
Figure 8E:
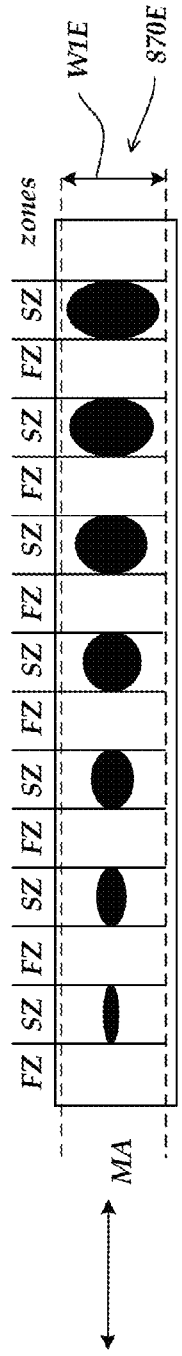

As shown in FIG. 8C, in the scale pattern 870C the varying plate and/or recessed areas are illustrated in both types of scale element zones FZ and S, simultaneously, and the varying areas are illustrated according to a sinusoidal-like function that increases in amplitude from left to right along the scale pattern. As shown in FIGS. 8D and 8E, in the scale patterns 870D and 870E, the varying plate and/or recessed areas are illustrated in each of the second scale element zones SZ while the first scale element zones FZ remain constant. In the scale pattern 870D, the varying areas are illustrated according to a number of similarly-sized horizontally-oriented oval shapes, wherein the number of shapes increases from left to right along the scale pattern. In the scale pattern 870E, the varying areas are illustrated according to a vertically oriented oval shape with a height that increases from left to right along the scale pattern.

Figure 8F:
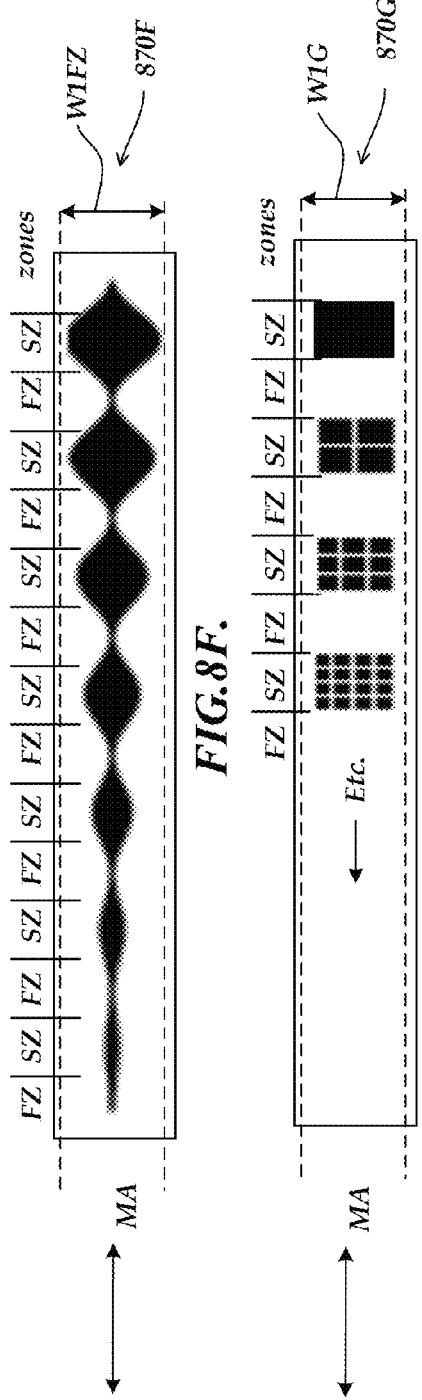
Figure 8G:
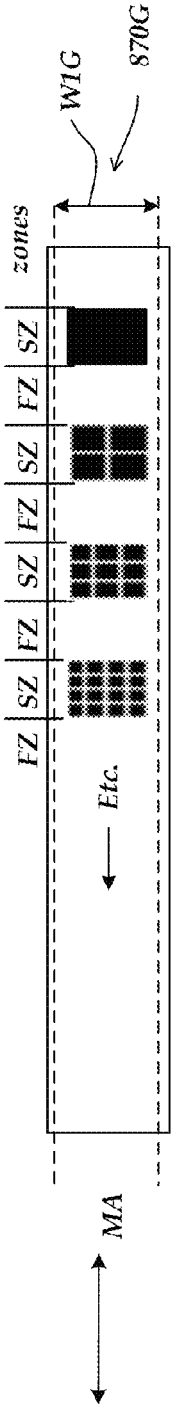

As shown in FIG. 8F, in the scale pattern 870F the varying plate and/or recessed areas are illustrated in both types of scale element zones FZ and S, simultaneously, and the varying areas are illustrated according to a sinusoidal-like function that increases in amplitude from left to right along the scale pattern. As shown in FIG. 8G, in the scale pattern 870G each of the first scale element zones FZ is the same while each of the second scale element zones SZ includes a respective conductive plate area. As illustrated, the area of each conductive plate area may be fairly constant while subdivisions may be made to occur in a number such that the effective resistance offered to the eddy currents varies based on the number of subdivisions. It will be appreciated that in such a configuration the additional subdivisions in each plate conductive area will generally increase the resistance and decrease the eddy currents and their associated signal contributions (i.e., subtractions).

Figure 9B:
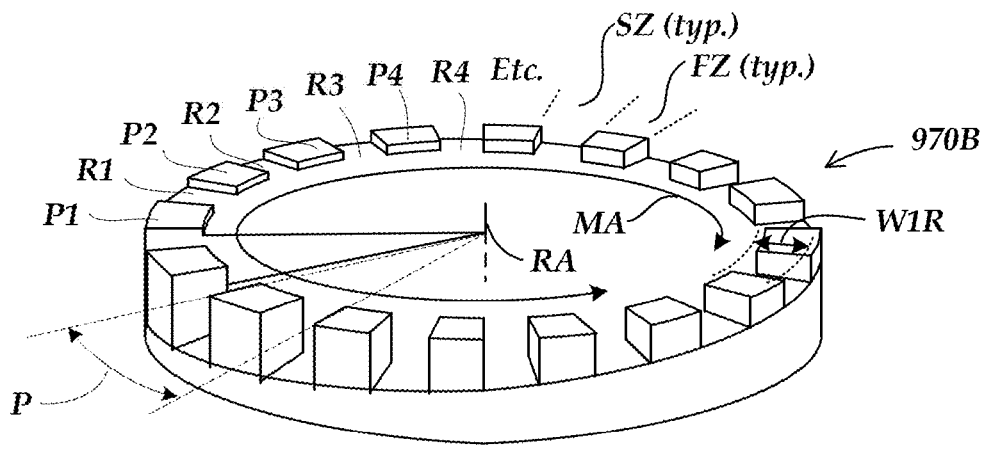
FIGS. 9A-9B are diagrams of embodiments of rotary or angular scale patterns analogous to those of FIGS. 3A-3C.
Figure 9A:
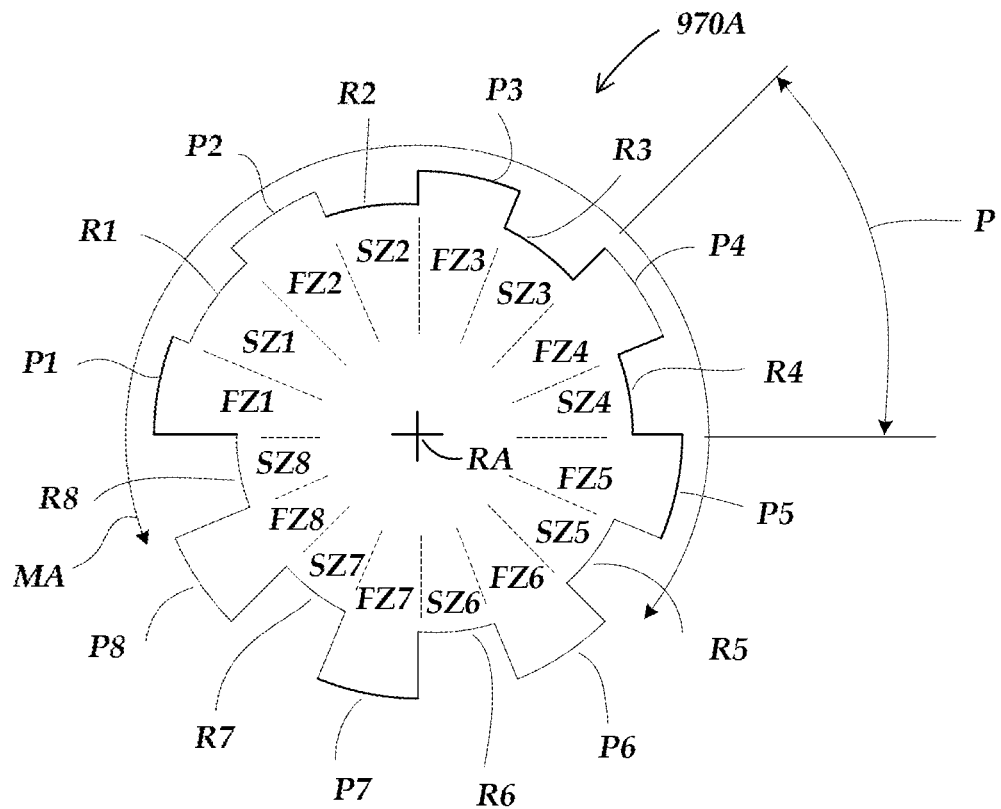

FIGS. 9A-9B are diagrams of embodiments of rotary or angular scale patterns which may otherwise be understood as operating similarly to the previously described analogous linear scales of FIGS. 3A-3C and/or 8A or 8B. Therefore, only significant differences and/or key elements will be described here. Each of the scale patterns 970A and 970B includes respective first scale element zones FZ and second scale element zones SZ. In these embodiments, the zones are angular zones, arranged according to the angular period or wavelength P. As shown in FIG. 9A, a side view diagram of the scale pattern 970A is illustrated, wherein the scale including the pattern 970A has a circular measuring axis direction MA and rotates or displaces about a central rotation axis RA. In the scale pattern 970A, each of the first scale element zones FZ includes a respective conductive plate area of the same height (radius) relative to the overall scale pattern 970A. Each of the second scale element zones SZ includes a respective radially recessed area. The radial recess depth of each of the recessed areas is shown to increase in a clockwise direction around the scale pattern, beginning with the second scale element zone SZ1 and ending with the second scale element zone SZ8, analogous to the configuration of FIG. 3A. Signal processing may be used to keep track of the signal transition between SZ8, FZ1 and SZ1 (for example), to resolve any ambiguity which may arise at the step change between SZ8 and SZ1, if needed. It will be understood that a read head analogous to those outlined above (or analogous to those disclosed in relation to FIGS. 18 and 19 in the previously incorporated '389 patent) may be located along or around the outer perimeter of the scale pattern 970A, in order to sense incremental and absolute signals in a manner analogous to previously outlined principles.

As shown in FIG. 9B, an isometric diagram of the scale pattern 970B is illustrated, wherein the scale including the pattern 970B has a circular measuring axis direction MA and rotates or displaces about a central axis RA. The scale pattern 970B is illustrated relative to a sensor/scale track width W1R. In the scale pattern 970B, each of the first scale element zones FZ includes a respective conductive plate area of the same axial height (e.g., the conductive plate areas are coplanar perpendicular to the rotation axis RA). Each of the second scale element zones SZ includes a respective axially recessed area. The axial recess depth of each of the recessed areas is shown to increase in a clockwise direction around the scale pattern, beginning with the second scale element zone SZ1, and so on, analogous to the configuration of FIG. 9A. Signal processing may be used to keep track of the signal transition in the vicinity of the conductive plate P1 and its adjacent recesses, to resolve any ambiguity which may arise at the step change between its adjacent recesses, if needed. It will be understood that a planar read head analogous to those outlined above (or analogous to those disclosed in relation to FIGS. 16 and 17 in the previously incorporated '389 patent) may be located axially facing the scale pattern 970B in the track width W1R, along a portion of the of the scale pattern 970B, in order to sense incremental and absolute signals in a manner analogous to previously outlined principles.

Figure 10:
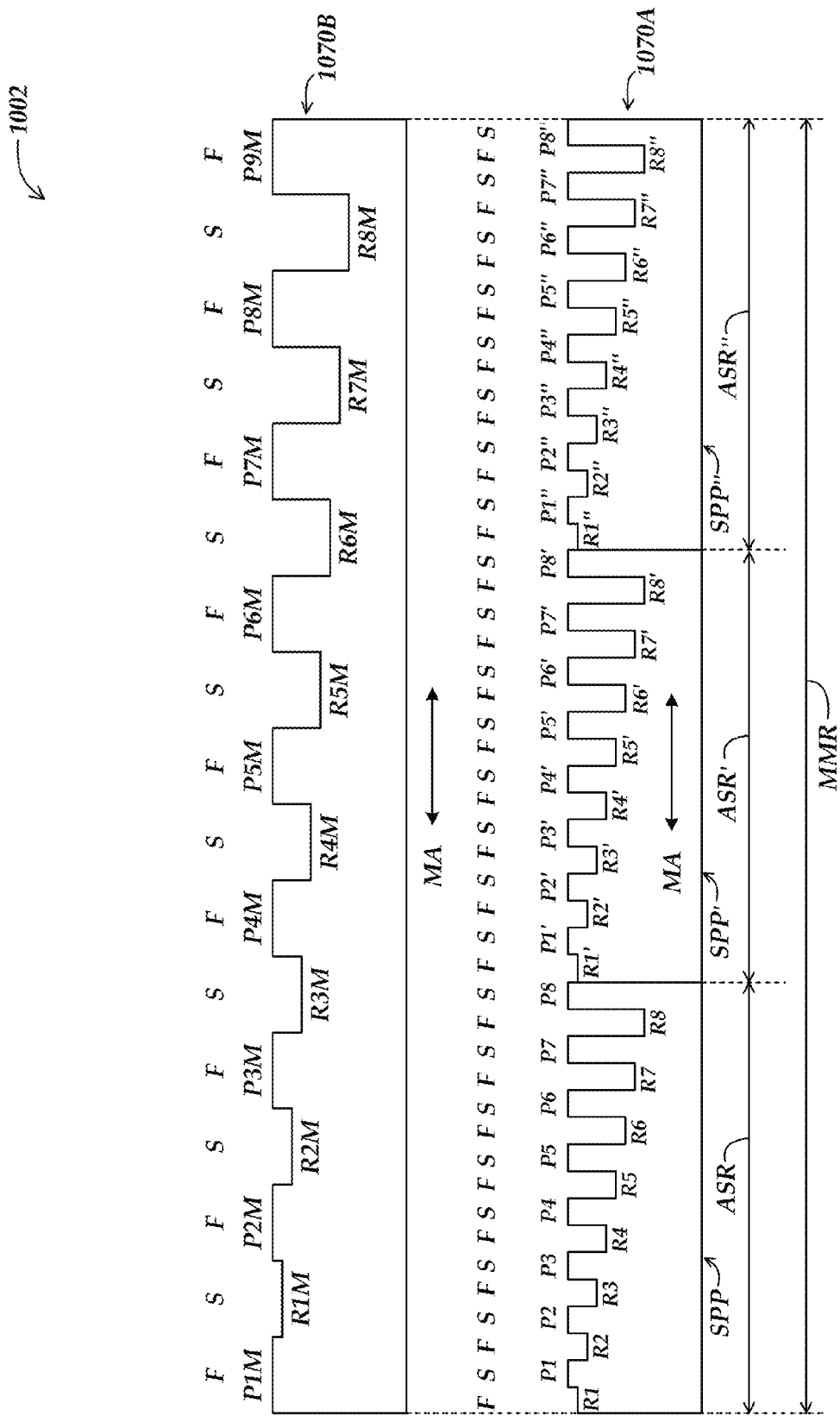
FIG. 10 is a diagram of two scale patterns utilized in conjunction on a scale.

FIG. 10 is a diagram of two scale patterns 1070A and 1070B utilized in conjunction on a scale 1002 to determine an absolute position. As shown in FIG. 10, the scale pattern 1070A is formed from three scale pattern portions SPP, SPP' and SPP". In various implementations, each of the scale pattern portions SPP, SPP' and SPP" may be similar to any of the previously described scale patterns (e.g., scale pattern 370A of FIG. 3A). Each of the scale pattern portions SPP, SPP' and SPP" includes respective first scale element zones FZ and second scale element zones SZ.

Each of the first scale element zones FZ includes a respective conductive plate area of the same height relative to the overall scale pattern 1070A. More specifically, the first scale element zones FZ of the scale pattern portions SPP, SPP' and SPP" include conductive plate areas P1-P8, P1'-P8' and P1"-P8", respectively. Each of the second scale element zones SZ includes a respective recessed area. More specifically, the second scale element zones SZ of the scale pattern portions SPP, SPP' and SPP" include recessed areas R1-R8, R1'-R8' and R1"-R8", respectively. The recess depth of each of the recessed areas is shown to increase from left to right along each respective scale pattern portion SPP, SPP' and SPP", similar to the configuration of FIG. 3A.

The scale pattern 1070A is shown to extend over a maximum measuring range MMR. Each of the scale pattern portions SPP, SPP' and SPP" is shown to extend over a respective portion of the maximum signal range MMR. More specifically, the scale pattern portion SPP extends over a first absolute signal range ASR that extends over a first portion of the maximum measuring range MMR. Correspondingly, the scale pattern portion SPP' extends over a second absolute signal range ASR' that extends over a second portion of the maximum measuring range MMR, and the scale pattern portion SPP" extends over a third absolute signal range ASR" that extends over a third portion of the maximum measuring range MMR.

In various implementations, the scale pattern 1070B may also be similar to any of the previously described scale patterns (e.g., scale pattern 370A of FIG. 3A). The scale pattern 1070B includes first scale element zones FZ and second scale element zones S, wherein each of the first scale element zones FZ includes a respective conductive plate area P1M-P9M that are each of the same height relative to the overall scale pattern 1070B, and each of the second scale element zones SZ includes a respective recessed area R1M-R8M. The recess depth of each of the recessed areas R1M-R8M is shown to increase from left to right along the scale pattern according to a linear function, similar to the configuration of FIG. 3A.

In the implementation of FIG. 10, the scale pattern 1070B may function as an absolute signal range identification portion that enables a determination of which absolute signal range ASR, ASR' or ASR" a position signal is associated with. In this manner, the scale pattern 1070B may essentially function as a "coarse" scale pattern, while the scale pattern portions SPP, SPP' and SPP" of the scale pattern 1070A may each essentially function as "medium" or "fine" scale patterns. In an alternative implementation, rather than a second scale pattern 1070B, other mechanisms may be utilized for an absolute signal range identification portion (e.g., binary code elements may be utilized along the scale 1002).

In one implementation, binary code elements for the absolute signal range identification portion (or alternatively for a stand-alone scale pattern) may be formed utilizing similar techniques as the other described scale elements. For example, a binary code may be formed utilizing a sequence of scale elements of two depths, such as conductive plate areas and recessed areas, arranged in a binary code sequence on the scale, which multiple read head sensors may be utilized to read. As another example, additional variations in the heights of the plate areas or depths of the recessed areas may be utilized to implement even higher order codes (e.g., utilizing 3+ variations).

It will be appreciated that these examples are exemplary only and not limiting. The various components described above may be positioned differently and take other forms than those outlined above, as will be appreciated by one of ordinary skill in the art based on this disclosure. For example, while several of the above described scale patterns include recessed areas, other types of scale elements may alternatively be utilized as plate abatement features (e.g., non-conductive areas). In general, for plate abatement features a characteristic that may be varied may include the amount of a non-conductive area, the amount of a recessed area, the recess depth of a recessed area, etc. For plate features, a characteristic that may be varied may include the amount of the plate area, the plate height, etc.

As another example, while it was noted above that certain scale patterns could be formed by making progressively deeper cuts in a bulk material (e.g., aluminum), in other implementations other fabrication techniques may be utilized. More specifically, in various implementations certain scale patterns may be formed in a scale portion including at least one of a printed circuit board, a patterned thin metal sheet including removed areas, a formed thin metal sheet including recesses formed by deformation of the thin metal sheet, a metal material piece including recesses formed by removal of the metal material, etc.

The various embodiments described above can be combined to provide further embodiments. All of the U.S. patents and U.S. patent applications referred to in this specification are incorporated herein by reference, in their entirety. Aspects of the embodiments can be modified, if necessary to employ concepts of the various patents and applications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled.

The invention claimed is:

1. A position sensing device usable to measure a position of a first member with respect to a second member along a measuring axis, the position sensing device comprising:
   a scale including a portion comprising a scale pattern extending along the measuring axis direction; and
   a read head for being moved relative to the scale pattern along the measuring axis direction, the read head comprising an excitation portion that excites the eddy currents in the scale pattern, and a signal portion that outputs position signals that vary depending on the eddy currents; wherein:
   the scale pattern comprises:
      a plurality of first scale element zones arranged periodically along the measuring axis direction, wherein the first scale element zones include a first type of scale element; and
      a plurality of second scale element zones arranged periodically along the measuring axis direction and interleaved with the plurality of first periodic scale element zones such that the first and second scale element zones repeat periodically along the measuring axis direction according to a scale wavelength P, wherein the second scale element zones include a second type of scale element having a characteristic that is varied in an absolute signal range along the scale pattern to provide a different respective eddy current response in different respective second scale element zones in the absolute signal range; and
   the signal portion is responsive to the respective eddy currents to output absolute position signals having a signal characteristic that varies along the absolute signal range to uniquely indicate respective positions along the absolute signal range.

2. The position sensing device of claim 1, wherein the absolute signal range is at least 10× the scale wavelength P.

3. The position sensing device of claim 1, wherein the first type of scale element comprises a plate feature and the second type of scale element comprises a plate abatement feature.

4. The position sensing device of claim 3, wherein the plate feature is the same in each of the first scale element zones.

5. The position sensing device of claim 3, wherein the plate feature comprises a conductive plate area and the plate abatement feature comprises at least one of a non-conductive area or a recessed area in a conductor.

6. The position sensing device of claim 5, wherein the characteristic of the second type of scale element that is varied in the absolute signal range along the scale pattern comprises at least one of a) the amount of the non-conductive area, b) the amount of the recessed area, or c) the recess depth of the recessed area.

7. The position sensing device of claim 6, wherein at least one characteristic that is varied in the absolute signal range is varied as a linear function along the absolute signal range.

8. The position sensing device of claim 3, wherein the second type of scale element comprises a conductive region and the plate abatement feature is formed in the conductive region.

9. The position sensing device of claim 8, wherein the scale pattern is formed in a scale portion comprising at least one of a printed circuit board, a patterned thin metal sheet including removed areas, a formed thin metal sheet including recesses formed by deformation of the thin metal sheet, or a metal material piece including recesses formed by removal of the metal material.

10. The position sensing device of claim 1, wherein the position sensing device has a maximum measuring range and the absolute signal range extends over the maximum measuring range.

11. The position sensing device of claim 1, wherein the position sensing device has a maximum measuring range and the absolute signal range is designated as a first absolute signal range that extends over a first portion of the maximum measuring range, with a second absolute signal range that is similar to the first absolute signal range extending over a second portion of the maximum measuring range, and the scale further comprises an absolute signal range identification portion that enables a determination of absolute position over the maximum measuring range.

12. The position sensing device of claim 11, wherein the absolute signal range identification portion comprises at least one of a second scale pattern or binary code elements along the scale.

13. The position sensing device of claim 1, wherein the first type of scale element in the first scale element zones has a characteristic that is varied in the absolute signal range along the scale pattern to provide a different respective eddy current response in different respective first scale element zones in the absolute signal range.

14. The position sensing device of claim 1, wherein the first type of scale element comprises a plate abatement feature that is the same in each of the first scale element zones, the second type of scale element comprises a plate feature, and the characteristic of the second type of scale element that is varied in the absolute signal range along the scale pattern comprises at least one of a) the amount of the plate area, or b) the plate height.

15. The position sensing device of claim 1, wherein the signal portion and the scale pattern are configured such that the signal characteristic varies linearly over the absolute signal range.

16. The position sensing device of claim 1, wherein the signal portion and the scale pattern are configured such that at least one output signal is periodic at the scale wavelength P and the signal characteristic comprises an amplitude or DC offset of the periodic output signal.

17. The position sensing device of claim 1, wherein the area of each first scale element zone is approximately the same as the area of each second scale element zone.

18. A scale for use in a position sensing device usable to measure a position of a first member with respect to a second member along a measuring axis, the scale comprising:
   a scale pattern extending along the measuring axis direction, the scale pattern being responsive to an eddy current read head that includes an excitation portion that excites the eddy currents in the scale pattern and a signal portion that outputs position signals that vary depending on the eddy currents; wherein:
   the scale pattern comprises:
      a plurality of first scale element zones arranged periodically along the measuring axis direction, wherein the first scale element zones include a first type of scale element; and
      a plurality of second scale element zones arranged periodically along the measuring axis direction and interleaved with the plurality of first periodic scale element zones such that the first and second scale element zones repeat periodically along the measuring axis direction according to a scale wavelength P, wherein the second scale element zones include a second type of scale element having a characteristic that is varied in an absolute signal range along the scale pattern to provide a different respective eddy current response in different respective second scale element zones in the absolute signal range; and
   the scale pattern is configured so as to cause a signal portion of an eddy current read head to output absolute position signals having a signal characteristic that varies along the absolute signal range to uniquely indicate respective positions along the absolute signal range.

19. The scale of claim 18, wherein the first type of scale element comprises a plate feature and the second type of scale element comprises a plate abatement feature.

20. The scale of claim 19, wherein the plate feature comprises a conductive plate area, the plate abatement feature comprises at least one of a non-conductive area or a recessed area in a conductor, and the characteristic of the second type of scale element that is varied in the absolute signal range along the scale pattern comprises at least one of a) the amount of the non-conductive area, b) the amount of the recessed area, or c) the recess depth of the recessed area.

* * * * *